US010700935B1

(12) United States Patent
Mousavi et al.

(10) Patent No.: US 10,700,935 B1
(45) Date of Patent: Jun. 30, 2020

(54) AUTOMATIC CONFIGURATION AND OPERATION OF COMPLEX SYSTEMS

(71) Applicant: Peritus.AI, Inc., Palo Alto, CA (US)

(72) Inventors: Amin Mousavi, Santa Clara, CA (US); Mohan Reddy, Fremont, CA (US); Santhosh Srinivasan, Los Altos, CA (US)

(73) Assignee: PERITUS.AI, INC., Palo Alto, CA (US)

( * ) Notice: Subject to any disclaimer, the term of this patent is extended or adjusted under 35 U.S.C. 154(b) by 0 days.

(21) Appl. No.: 16/287,997

(22) Filed: Feb. 27, 2019

(51) Int. Cl.
*H04L 12/24* (2006.01)
*G06N 5/02* (2006.01)
*G06F 11/34* (2006.01)
*G06N 3/08* (2006.01)

(52) U.S. Cl.
CPC ...... *H04L 41/0893* (2013.01); *G06F 11/3419* (2013.01); *G06F 11/3476* (2013.01); *G06N 3/08* (2013.01); *G06N 5/022* (2013.01); *H04L 41/145* (2013.01); *H04L 41/16* (2013.01)

(58) Field of Classification Search
CPC ... H04L 41/0893; H04L 41/145; H04L 41/16; G06N 3/08; G06N 5/022; G06F 11/3419; G06F 11/3476
See application file for complete search history.

(56) References Cited

U.S. PATENT DOCUMENTS

| 2016/0092484 | A1* | 3/2016 | Finkler | G06F 16/258 707/715 |
| 2018/0225587 | A1* | 8/2018 | Khidekel | G06Q 10/04 |
| 2019/0384257 | A1* | 12/2019 | Zhang | G05B 19/0428 |

OTHER PUBLICATIONS

Wang, Z., de Freitas, N., and Lanctot, M. "Dueling Network Architectures for Deep Reinforcement Learning", ArXiv e-prints, arXiv:1511.06581, dated 2015, 15 pages.
Van Aken et al., ". Automatic Database Management System Tuning Through Large-scale Machine Learning". Proceedings of the 2017 ACM International Conference on Management of Data. ACM, 16 pages.
Espeholt et al., "Impala: Scalable Distributed Deep-RL with Importance Weighted Actor-learner Architectures". arXiv preprint arXiv:1802. 01561, dated 2018, 22 pages.

* cited by examiner

*Primary Examiner* — Michael A Keller
(74) *Attorney, Agent, or Firm* — Hickman Palermo Becker Bingham LLP (57) ABSTRACT

A system operation management server computer (server), agent computer (agent), and related methods are disclosed to configure and manage the operation of systems in a system category. In some embodiments, the server and a plurality of agents are programmed to collaborate on exploring and improving the operation of systems in a system category through reinforcement learning.

18 Claims, 6 Drawing Sheets

AUTOMATIC CONFIGURATION AND OPERATION OF COMPLEX SYSTEMS

FIELD OF THE DISCLOSURE

One technical field of the present disclosure is system operational management. Another technical field is computer-implemented analysis of logs and learning of operational behavior of complex systems to guide further system operation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As technology continues to advance, more complex systems are being built and utilized. Such a system can be mechanical, electrical, computational, or of another nature. One example of such a system is a farming seeder, and another example is a database management system (DBMS). The system is typically configurable with a large number of parameters related in various ways, and different combinations of values set for the parameters lead to different performance levels for the system. The large number of parameters and relationships among the parameters and the overall complexity of the system mean that it can be difficult to determine how to operate the system to achieve the best performance level. A person may build up knowledge regarding the system over time. However, resolving an issue encountered by the system may still require more knowledge than available or less time than necessary to explore all existing knowledge.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENT
3. EXAMPLE COMPUTER COMPONENTS
4. FUNCTIONAL DESCRIPTIONS
  4.1. MODELING SYSTEM OPERATION VIA REINFORCEMENT LEARNING
    4.1.1. BASIC APPROACH
    4.1.2. ADVANCED APPROACH
  4.2. GUIDING SYSTEM OPERATION FOR CONTINUED REINFORCEMENT LEARNING
5. EXAMPLE PROCESSES
6. HARDWARE IMPLEMENTATION

1. General Overview

A system operation management server computer (server), agent computer (agent), and related methods are disclosed to configure and manage the operation of systems in a system category. In some embodiments, the server and a plurality of agents are programmed to collaborate on exploring and improving the operation of systems in a system category through reinforcement learning.

In some embodiments, the server is programmed to communicate with the plurality of agents that represent a plurality of systems in the system category. For example, the system category may load balancing, and the systems in the system category can be different load balancers developed by different vendors. Each agent is programmed to communicate with a system in the system category. The agent can also be integrated into the system. The agent is programmed to monitor the operation of the system and transmit a record of the monitored operation to the server from time to time. The system can operate at this point according to an arbitrary policy, such as randomly choosing one or more one or more parameters of the system and randomly choosing new values to assign to the selected parameters. The record may include, at each of different points in time, the state of the system in terms of the values of the parameters of the system and other data indicating the performance level of the system. For example, when the system category is load balancing, the performance level can correspond to the number of times each processor needs to reject a request or refer the request to another processor. In other words, the record may indicate how the system traverses the state space to reach different values for the performance level. The server can be programmed to further construct a mapping between a default list of parameters for the system category and a list of parameters of a system in the system category, or a mapping between a performance indicator for the system category and the performance level of the system.

In some embodiments, the server is programmed to initially coordinate data collection to identify a subset of the default list of parameters. More specifically, based on the records transmitted by the agents from which, for each of different points in time, values of the default list of parameters and a corresponding value the performance indicator for the system category can be derived, the server can be programmed to select a subset of the list of default parameters that highly correlate with the performance indicator as a condensed list of parameters.

In some embodiments, the server is programmed to coordinate further data collection and model system operation.

More specifically, the server can be programmed to receive additional records from the agents from which, for each of different points in time, values of the condensed list of parameters and a corresponding value of the performance indicator can be derived. By modeling the operation of each system in the system category as a Markov process, for example, the server can be programmed to treat the condensed list of parameters as corresponding to a state, a move from one state to another as corresponding to an action, the performance indicator as corresponding to a reward, and an association between the state and the reward as corresponding to an objective function. The server can then be programmed to further apply a reinforcement learning method to continue gaining knowledge regarding the objective function and improving a policy that determines how to move from a given state to another state to ultimately achieve the highest reward.

In some embodiments, the server is programmed to assist further operation of a given system in the system category. The given system can be one of the plurality of systems that have produced the records used by the server to develop the policy. The given system can also be another system in the system category. Upon receiving information regarding the state of the given system, the server can be configured to send the policy in the current form to the given system, which can be configured to then take the next action according to the policy. Alternatively, the server can be configured to identify the next action according to the policy and communicate data regarding the identified action to the given system.

The server and the agents offer certain technical benefits. The server together with the plurality of agents enables parallel exploration of the state space and the objective function through multiple systems, which reduces the time it takes to model the system operation and refine the policy for taking the next action towards the optimal system performance. Such reduction in time is also conducive to an aggressive exploration of the state space, including taking actions that each correspond to simultaneously changing values of multiple parameters of a system. The multiple systems can be copies of the same system or different systems in the same system category. By realizing that systems in a system category generally share a number of parameters, the server together with the plurality of agents allows expedient exploration of the state space and the objective function for multiple systems, obviating the need to separately model the system operation for each system. Furthermore, by automatically monitoring system operation and analyzing the resulting records or logs, the server together with the plurality of agents eliminates the need for a user to manually operate any system or determine how to resolve any issue during the system operation. In addition, by applying advanced analytics such as reinforcement learning, the server promotes intelligent traversal of the state space to increase the reach within the state space and move towards states corresponding to optimal rewards.

2. Example Computing Environment

Figure 1:
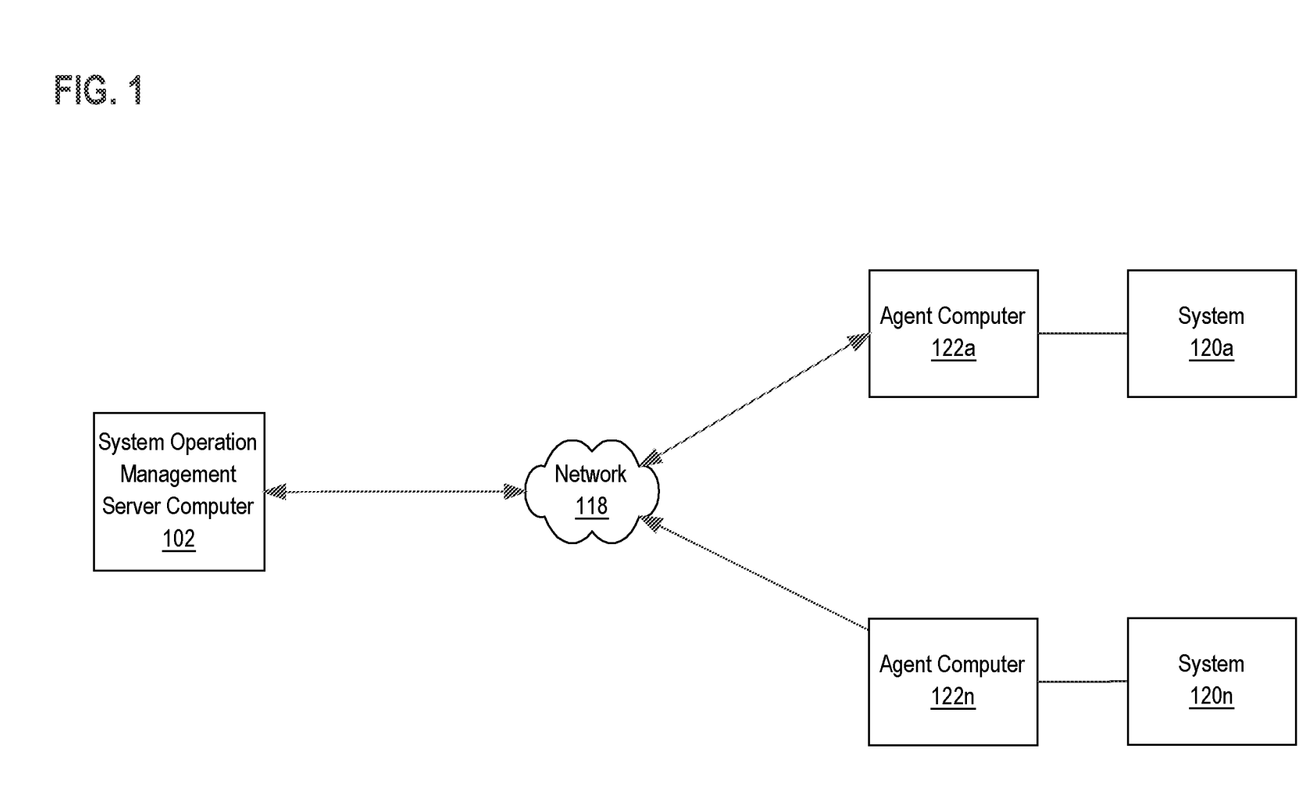
FIG. 1 illustrates an example networked computer system in which various embodiments may be practiced.

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a system operation management server computer 102 (server) and one or more agent computers (agents) 122a-n, which are communicatively coupled directly or indirectly via one or more networks 118. The one or more agents 122a-n are coupled to one or more configurable systems 120a-n in a system category. In other embodiments, one of the one or more agents 122a-n can be integrated into the corresponding configurable system.

In some embodiments, the server 102 broadly represents one or more computers, virtual computing instances, and/or instances of an application that is programmed or configured with data structures and/or database records that are arranged to host or execute functions related to configuring and managing system operation for systems in the system category. These functions can include selecting a specific list of parameters and a performance indicator for the system category, integrating data collection efforts by a plurality of agents for a plurality of systems in the system category, or building a policy that specifies an action for a system in the system category to take towards an optimal reward. The server 102 can comprise a server farm, a cloud computing platform, a parallel computer, or any other computing facility with sufficient computing power in data processing, data storage, and network communication for the above-described functions.

In some embodiments, each of the systems 120a-n includes a computer component that is or communicates with one of the agents 122a-n, but can otherwise include any component that is coupled to the computer component and forms a part of the system having a number of parameters that represents the state of the system. A performance level of the system represents a reward produced by the system. Each of the systems 120a-n is generally programmed to record its activities according to a schedule, such as periodically or in response to predefined events. Each of the systems 120a-n can also be programmed to read a specification of parameter values and changing operation by taking on the specified parameter values.

In some embodiments, each of the agents 122a-n is coupled to or integrated into one of the systems 120a-n. The coupling may be through a direct connection or through the networks 118. The agent is programmed to monitor or direct the operation of the corresponding system under a given policy that specifies how to move from one state to the next. The agent is also programmed to transmit a result of monitoring the system operation to the server 102 for improving a specific policy and receive the specific policy from the server to further direct the operation of the corresponding system. Each of the agents 122a-n may have a similar hardware composition as the server 102 or may comprise a desktop computer, laptop computer, tablet computer, smartphone, wearable device, or any other type of computing device with sufficient computing power in data processing, data storage, and network communication.

The networks 118 may be implemented by any medium or mechanism that provides for the exchange of data between the various elements of FIG. 1. Examples of the networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the agents 122a-n are programmed to transmit to the server 102 logs recording events occurring during the operation of the systems 120a-n in the system category. The server 102 is programmed to accumulate knowledge regarding the objective function that corresponds to an association of the state with the reward for the system category and develop a policy that determines how a system in the system category moves from one state to another to ultimately achieve an optimal reward. The server 102 can be configured to send the policy in development to one or more of the agents 122a-n from time to time. Any of the agents 122a-n receiving the policy can be configured to then effect the operation of the corresponding system according to the received policy.

3. Example Computer Components

Figure 2A:
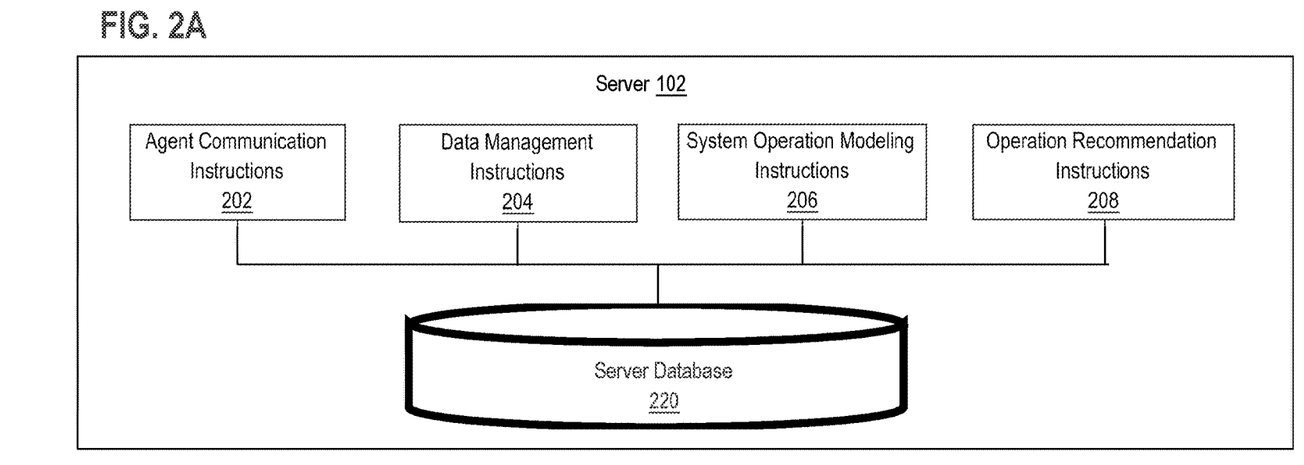
FIG. 2A illustrates example components of a system operation management server computer in accordance with the disclosed embodiments.
Figure 2B:
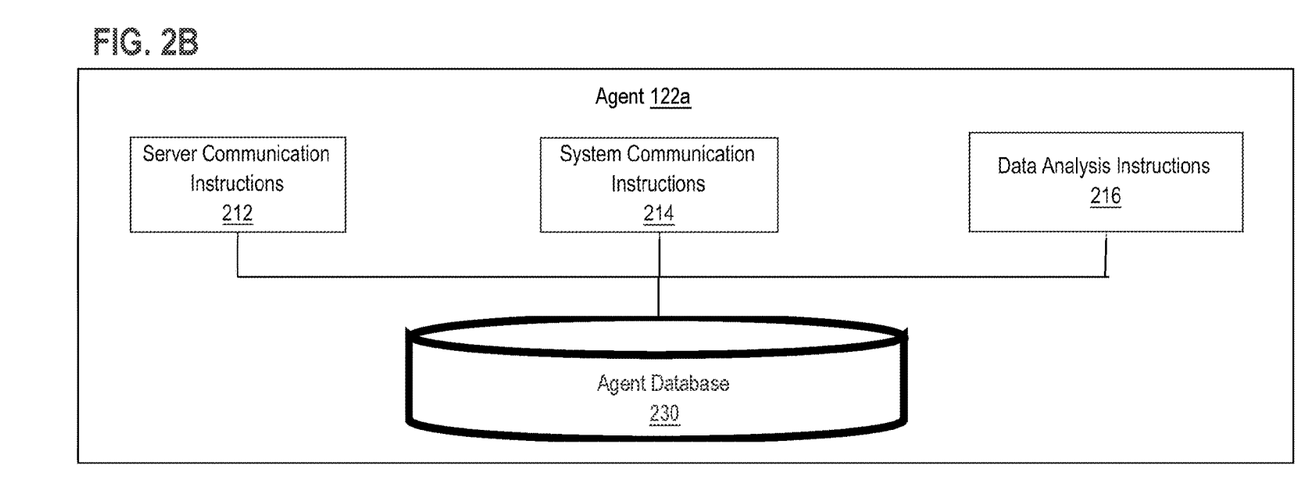
FIG. 2B illustrates example components of an agent computer in accordance with the disclosed embodiments.

FIG. 2A illustrates example components of a system operation management server computer in accordance with the disclosed embodiments. FIG. 2B illustrates example components of an agent computer in accordance with the disclosed embodiments. Each of these figures is for illustration purposes only and the server 102 or the agent 122a can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

Referring to FIG. 2A, in some embodiments, the server 102 can comprise agent communication instructions 202, data management instructions 204, system operation modeling instructions 206, and operation recommendation instructions 208. In addition, the server 102 can comprise a server database 220.

In some embodiments, the agent communication instructions 202 enable communication with the agents 122a-n. The communication can include receiving logs of the operation of the systems 120a-n, transmitting a specification of one or more lists of parameters and a performance indicator for a system category, receiving a specification of a specific list of parameters of one of the systems 120a-n or a mapping between that specific list of parameters and a certain list of parameters for the system category, transmitting a policy for determining which action for one of the systems 120a-n to take, receiving state information related to one of the systems 120a-n, or transmitting a recommendation for the next action to take by one of the systems 120a-n.

In some embodiments, the data management instructions 204 enable management of certain types of data for configuring and managing the system operation for the system category. The management can include defining or selecting a list of parameters and a performance indicators for the system category or determining a mapping between a list of parameters defined for the system category and a specific list of parameters of one of the systems 120a-n. In certain embodiments, the management can also include analyzing logs received from the agents 122a-n to derive values for the list of parameters or the performance indicator defined for the system category at different time points.

In some embodiments, the system operation modeling instructions 206 enable modeling system operation for systems in the system category. The modeling can include applying a reinforcement learning method, where the list of parameters for the system category corresponds to the state and the performance indicator for the system category corresponds to the reward, and changing values for one or more of the list of parameters at once corresponds to an action taken to move from one state to another.

In some embodiments, the operation recommendation instructions 208 enable recommending an action to take for a system in the system category. The recommending can include evaluating the policy developed via reinforcement learning and determining the next action to take for a system in a specific state.

In some embodiments, the server database 220 is programmed or configured to manage storage of and access to relevant data, such as definitions of system parameters or performance indicators, mappings between lists of parameters, system logs, digital models for dimensionality reduction or reinforcement learning, or other data related to the agents 122a-n or the systems 120a-n.

Referring to FIG. 2B, in some embodiments, the agent 122a can comprise server communication instructions 212, system communication instructions 214, and data analysis instructions 216. In addition, the agent 122a can comprise an agent database 230.

In some embodiments, the server communication instructions 212 enable communication with the server 102. The communication can include transmitting logs of the operation of the systems 120a, receiving a specification of one or more lists of parameters and a performance indicator for a system category, transmitting a specification of a specific list of parameters of the system 120a or a mapping between that specific list of parameters and a certain list of parameters for the system category, receiving a policy for determining which action for the system 120a to take, transmitting state information related to the system 120a, or receiving a recommendation for the next action to take by the system 120a.

In some embodiments, the system communication instructions 214 enable communication with the system 120a. The communication can include receiving values of the parameters and the performance level of the system 120a or other activity metrics related the operation of the system 120a or transmitting new values for the parameters of the system 120a.

In some embodiments, the data analysis instructions 216 enable analysis of logs or other indicators of the operation of the system 120a. The analysis can include deriving values for a specific list of parameters of the system 120a or the corresponding performance level of the system 120a at different time points. In certain embodiments, the analysis can also include determining a mapping between the specific list of parameters of the system 120a and a list of parameters defined by the server 102 for the system category.

In some embodiments, the agent database 230 is programmed or configured to manage storage of and access to relevant data, such as definitions of parameters or performance indicators of the system 120a and for the system category, mappings between lists of parameters, logs of the system 120a, a digital model representing a policy that specifies how to assign values to the parameters of the system 120a, or other data related to the system 120a.

4. Functional Descriptions

4.1. Modeling System Operation Via Reinforcement Learning

4.1.1. Basic Approach

In some embodiments, the server 102 is programmed to define one or more system categories, where each system category may correspond to a type of configurable physical devices or a type of configurable software programs. For example, one system category may be farming seeding, and the systems in this category would be farming seeders. Another system category may be database management, and the systems in this category would be database management systems (DBMSs). The consideration of a system category allows the simultaneous modeling of system operation for all systems in the system category, as further discussed below. The server 102 is programmed to further define a set of default parameters or configurable settings for each system category. For example, for a farming seeder, one parameter can be the seed row spacing, and another parameter can be the sowing speed. For a DBMS, one parameter can be the heap size, and another parameter can be the log retention. For a load balancer, one parameter can be a maximum connection limit, and another parameter can be the makespan. The server 102 is programmed to further associate each of the default parameters with a default value range indicating the possible values that can be taken on by the default parameter.

In some embodiments, the server 102 is programmed to also define at least one performance indicator for each system category. For example, for a farming seeder, the performance indicator may be the number of seeds planted per unit time. For a DBMS, the performance indicator can be the number of queries executed per unit time. For a load balancer, the performance indicator can be the average response time or the spillover count per unit time.

In general, multiple systems in one system category often share a majority of possible configurable settings for the system category, even if certain configurable settings may have different names in different systems. In some embodiments, for each of the multiple systems, such as two load balancers implemented by two unrelated vendors, the server 102 can be programmed to initially receive a specific list of parameters of the system and map that specific list of parameters to a list of default parameters for the system category and store the mapping or send the mapping back to the system. Alternatively, the mapping can be prepared, stored, utilized, or otherwise managed by the system.

In some embodiments, the server 102 is programmed to determine, given the state of a system defined by values of associated parameters, which action to take, where an action corresponds to further configuring one or more of the parameters, to improve an ultimate reward, which corresponds to a performance level of the system. The system operation can be modeled as a Markov decision process, for example, where the current performance level of the system depends on only the current state of the system and effectively reflects a "cumulative" reward or improvement in performance from taking a series of actions. The transition probability for an action may reflect the generally unrestricted nature of moving from one state to the next and ultimately indicate the desirability of taking the action to achieve an optimal reward. When the state space is relatively large, which is often the case with a modern, complex, configurable system, it is generally difficult to have full knowledge of the objective function that associates a state with a reward. Therefore, the system 102 is programmed to apply reinforcement learning to continuously enhance the knowledge of the objective function and improve a policy for determining which action to take next, based on the system performance resulting from taking an action according to the policy. Example reinforcement learning methods include Q-learning, state-action-reward state-action (SARSA), deep Q network (DQN), or another model-free, value-based method, where the reward corresponding to a state is readily observable.

Figure 3:
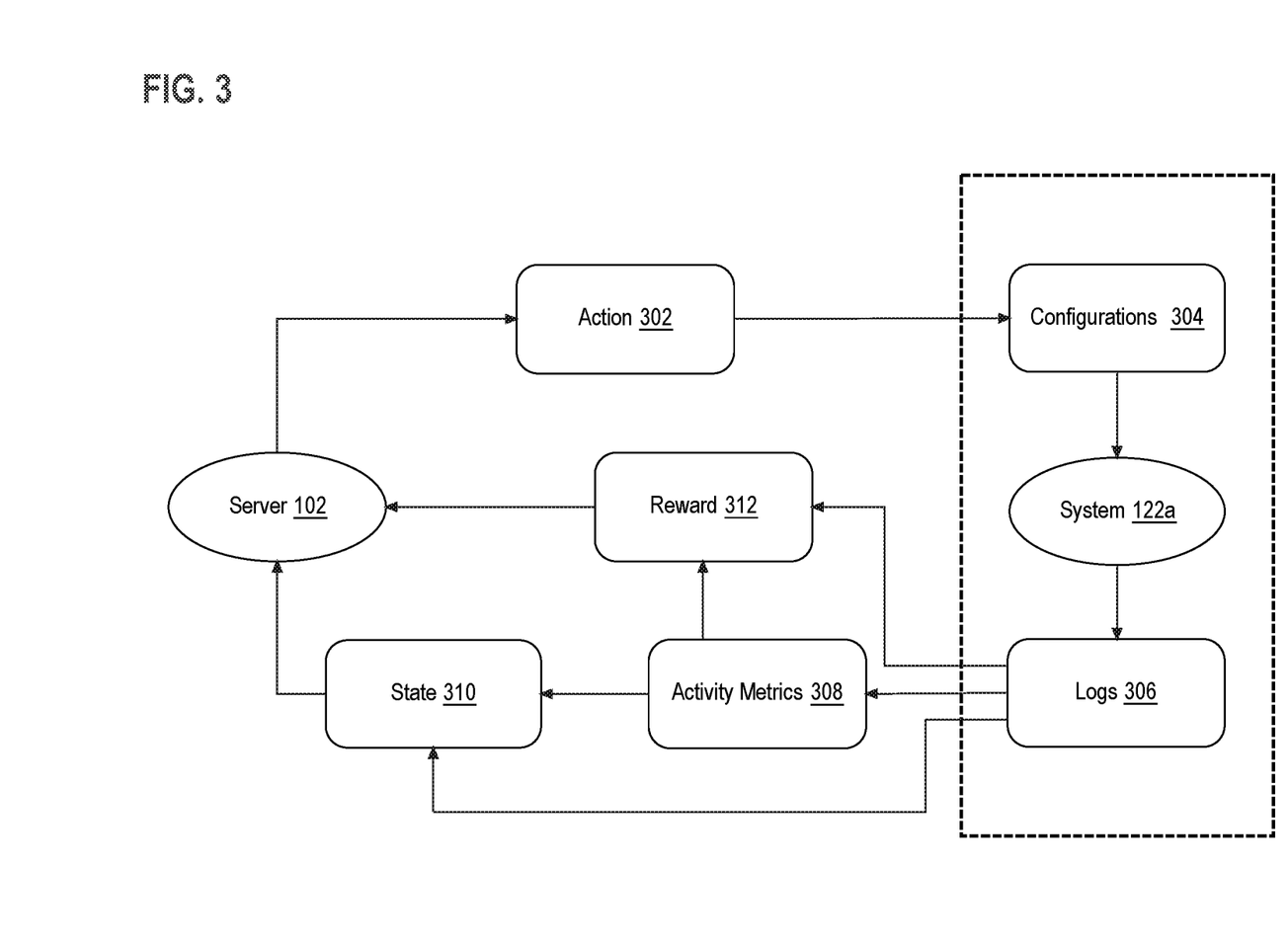
FIG. 3 illustrates an example data flow between the system operation management server and a system or a corresponding agent computer.

FIG. 3 illustrates an example data flow between the server 102 and the system 122a or the corresponding agent 120a. In some embodiments, the server 102 is programmed to apply reinforcement learning by receiving new operational data produced by the system 120a in going through a series of states, each corresponding to a specific combination of values set for the list of parameters of the system 120a. The traversal through the series of states or the production of the operational data can be a result of human operation or observation or automatic operation or capture. Either a human or a machine, which could be the system 122a or the agent 120a, may decide in real time the next state of the system. Such decisions may come from one or more configurations 304 or documents containing values to be set for the parameters of the system 122a. In addition, entries can be created in one or more logs 306 by a human or automatically by the machine for every predefined system event, such as a system error. Each entry generally indicates at least a part of the state of the system or the performance level of the system when a predefined event occurs. The entry can also include related data, such as the nature of the event, the time of occurrence of the event, or the source of the event.

In some embodiments, the server 102 can be programmed to read the entries in the logs 306, derive the values of the parameters and the performance indicator of the system for different time points, and feed these values to the reinforcement learning method being applied. Each entry may indicate only specific activity metrics 308 related to the operation of the system 122a. They entry may not contain the current value of every parameter and the current value of the performance indicator defined for the system category. More specifically, an entry may include only a current value of a parameter that is different from the previous value of the parameter at the last time point. Therefore, the previous value of the parameter is to be reused to fully characterize the current state and produce the state data 310. In addition, an entry may include only values related to the performance indicator without directly indicating the value of the performance indicator. For example, when the system 122a is a DBMS, the entries may indicate only when a query is received and processed, and such data is to be converted to obtain an aggregate number of queries processed per unit time as the reward data 312. When the system 122a is a load balancer, the entries may only indicate when a request for performing task is received and processed by each processor, and such data is to be converted to obtain an aggregate response time as the reward 312. At some point, the mapping to convert values of the list of parameters of the system 122a to values of the list of parameters defined for the system category by the server 102 is also to be applied. In certain embodiments, the agent 120a can be programmed to perform one or more of these tasks of transforming log entries in the logs 306 into the state data 310 and the reward data 312 ready for consumption by a reinforcement learning method.

The system 122a can be programmed to read the log entries continuously or according to a specific schedule. The server 102 can also be programmed to receive the values of parameters and the performance indicator directly from the human or the machine. Based on the operational data and ultimately the state data 310 and the reward data 312 derived from the operation of the system 122a and the rest of the systems 122a-n, the server 102 is programmed to model the system operation for the system category via reinforcement learning and continuously develop a policy for determining the next action to take for a system in the system category. The server 102 can be programmed to further send the policy or a description of a specific action 302 according to the policy to the system 122a, which can be incorporated into the configurations 304 and effect further operation of the system 122a.

In some embodiments, the server 102 is programmed to apply reinforcement learning by obtaining existing operational data from certain sources. An existing log recording prior activities of the systems 122a can be such a source. In addition, benchmarking data may have been produced and published using another instance of the system 122a or another system in the same system category. Such benchmarking data may contain similar entries indicating the value of the performance level of the system under various sets of values for the parameters of the system.

In some embodiments, the server 102 is programmed to receive new operational data from multiple sources simultaneously, with multiple systems exploring the state space and the objective function in parallel. The server 102 can be programmed to then receive new operational data produced by the multiple systems as each of the multiple systems independently traverses a series of states that affect the performance indicator. As noted above, each of the multiple systems or an agent thereof may decide the next action to take and thus the next state of the system based on the last policy received from the server 102 or another policy.

In some embodiments, the server 102 is programmed to then apply reinforcement learning to continuously enhance the knowledge of the objective function for the system category and improve the policy for the system category that specifies the next action to take to ultimately achieve an optimal reward, based on the new operational data produced by the multiple systems. The server 102 can be configured to properly integrate the new operational data from the multiple sources produced according to potentially different policies with an existing approach, such as the importance weighted actor-learning architecture (IMPALA). In applying IMPALA, the multiple systems correspond to the actors and the server 102 correspond to the trainer, with the data collection decoupled from the policy calculation. The server 102 can be programmed to further transmit the improved policy to one or more of the multiple systems or the corresponding agents, which can then use the updated policy in further exploring the state space and producing more operational data.

4.1.2. Advanced Approach

In some embodiments, the server 102 is programmed to model system operation for the system category in two stages to increase overall efficiency. In the first stage, the server 102 is programmed to identify a subset of the list of default parameters, effectively reducing the state space. The server 102 can be configured to initially retrieve new or existing operational data produced by multiple systems in the system category, as discussed in the last section. An agent can be configured to enforce an arbitrary policy for traversing the state space in the production of new operational data by a corresponding system. The server 102 can be configured to transform the retrieved operational data to useful state data and reward data, which may involve mapping a system-specific parameter to a default parameter or computing the value of a performance indicator, as necessary. From the derived state data and reward data, which include entries each corresponding to a state and a performance indicator of a system in a system category at a certain time point, the server 102 is programmed to identify a subset of the list of default parameters that show a relatively high correlation with the performance indicator. The server 102 can be programmed to identify the subset of default parameters using an existing approach, such as the least absolute shrinkage and selection operator (LASSO) or other regression techniques. Similar approaches can be used to reduce the dimensionality of the state space or trim the list of default parameters, such as principal component analysis (PCA), independent component analysis (ICA), canonical correlation analysis (CCA), factor analysis, random projection, or clustering.

In some embodiments, in the second stage, the server 102 is programmed to model system operation for the system category based on the reduced state space characterized by the subset of default parameters. The server 102 can be configured to communicate the subset of default parameters to each of the systems or the corresponding agent, which is configured to then collect operational data over the reduced state space. Alternatively, the server 102 can be configured to trim down the operational data generated over the original state space to fit the reduce state space. From the operational data over the reduced state space, the server 102 is programmed to further apply reinforcement learning to continuously enhance the knowledge of the objective function and improve a policy for determining the next action to take, as discussed above. In addition, the server 102 can be programmed to transmit the improved policy to each of the multiple systems or the corresponding agent periodically, upon retrieving a certain amount of additional operational data, or according to another specific schedule. An agent can be configured to enforce any received policy for further traversing the state space in the production of additional operational data by a corresponding system.

4.2. Guiding System Operation for Continued Reinforcement Learning

In some embodiments, in response to receiving certain operational data produced by a particular system in a system category, the server 102 is programmed to produce a recommendation for the next action to take by the particular system. The system may be in production, operated by a human, or otherwise does not actively and continuously take next actions according to any specific policy. A recommendation for the next action to reach a different state may be helpful to the particular system when the system encounters an error and a solution is not immediately apparent, for example. In this case, the operational data generally indicates the state of the machine as the error was encountered and the specific error status. The server 102 is programmed to suggest a next action based on the current policy for the system category, which tends to be more accurate when more knowledge of the objective function has become available. More specifically, with the recommended action corresponding to changing the values of one or more default parameters, the server 102 can be configured to map the one or more default parameters to one or more parameters of the particular system. The server 102 can be configured to then prepare and transmit a recommendation indicating how to take the next action involving changing the values of the one or more parameters of the particular system. The recommendation can include additional information, such as a confidence value that the recommended action is the right action, which may correspond to the transition probability from the current state to the next state to be reached by taking the recommended action, for example.

In some embodiments, in response to transmitting a recommendation to the particular system or a corresponding agent, the server 102 is programmed to receive additional operational data produced by the particular system from taking the recommended action. The server 102 can be programmed to feed the additional operational data into the reinforcement training process to further enhance the knowledge of the objective function and improve the policy, as discussed above.

5. Example Processes

Figure 4:
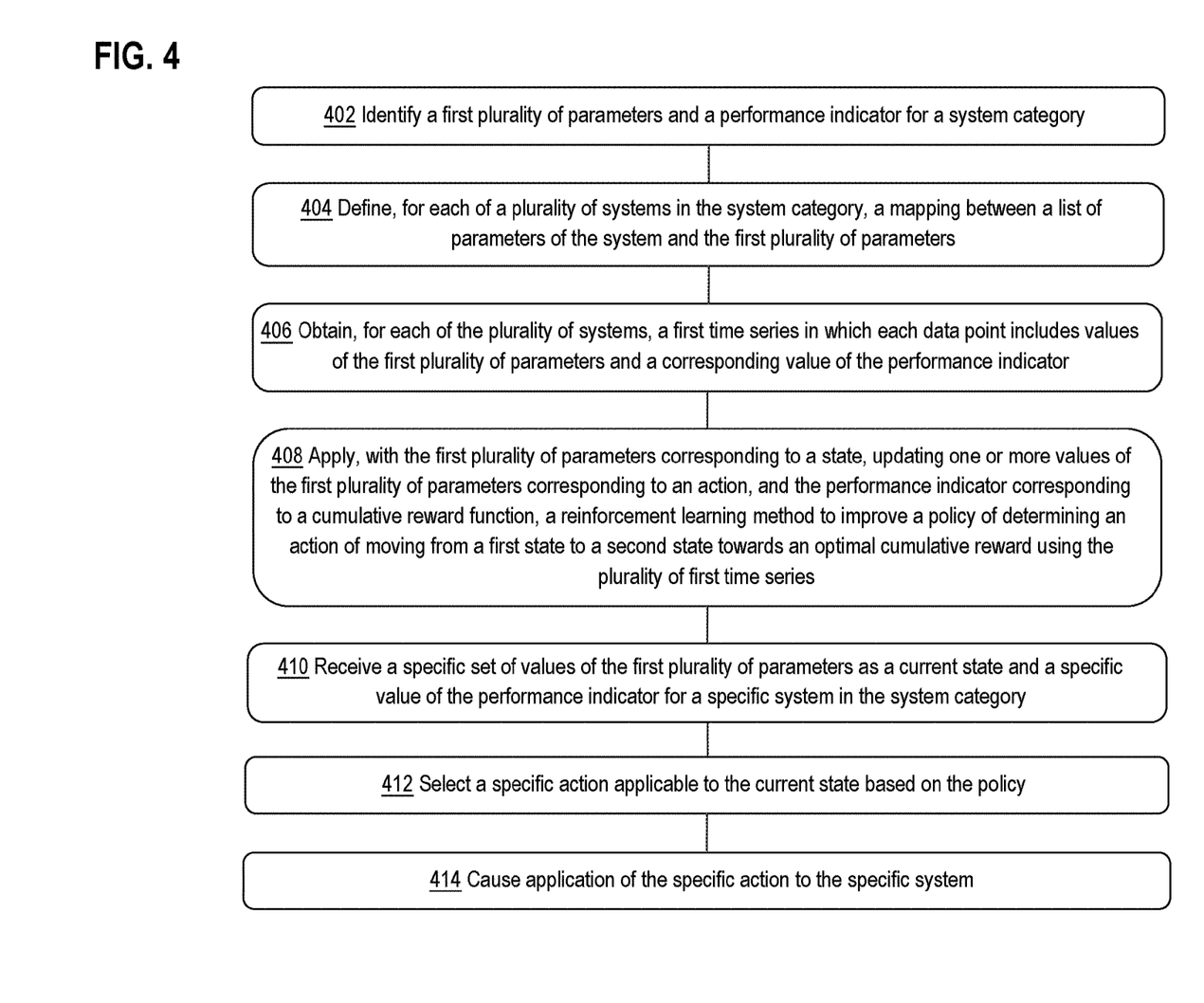
FIG. 4 illustrates an example process performed by the system operation management server computer of modeling and managing the operation of systems in a system category.
Figure 5:
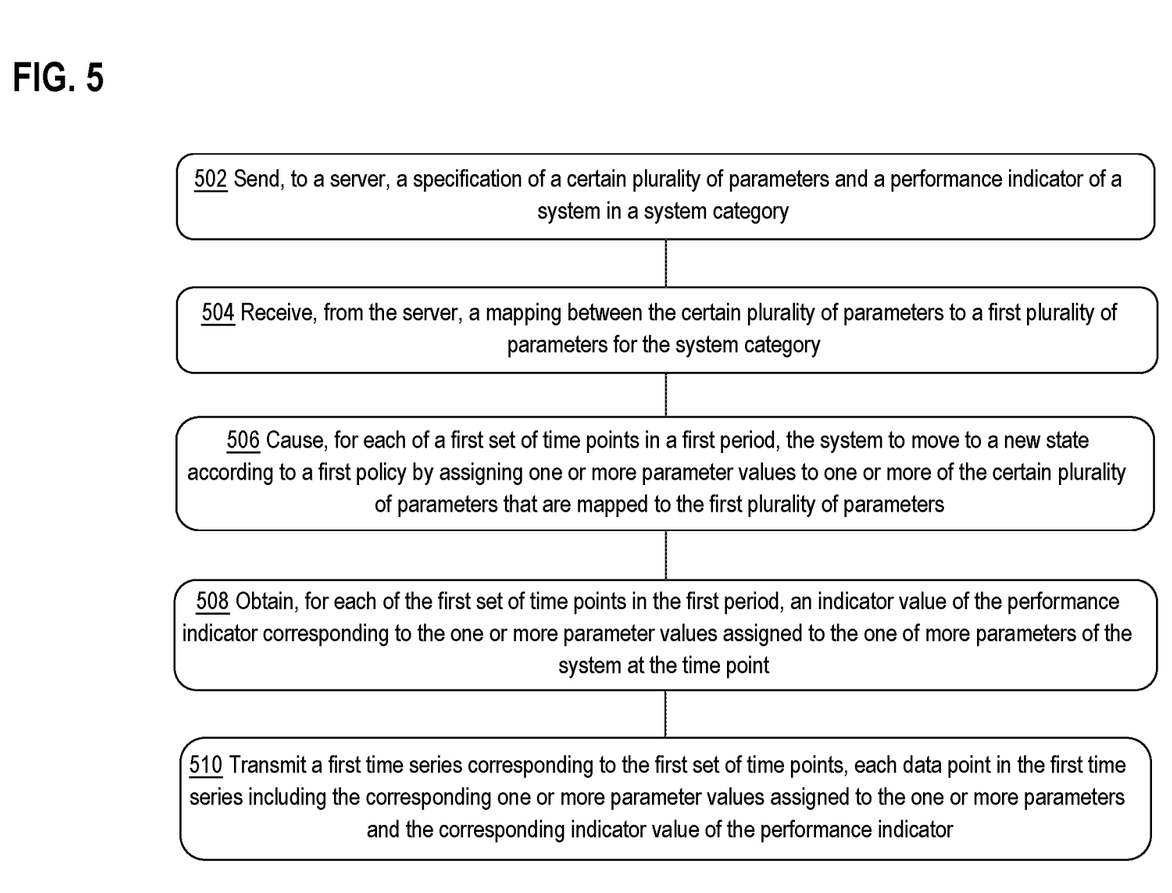
FIG. 5 illustrates an example process performed by an agent computer of managing the operation of a system in a system category.

FIG. 4 illustrates an example process performed by the system operation management server computer of modeling and managing the operation of systems in a system category. FIG. 5 illustrates an example process performed by an agent computer of managing the operation of a system in a system category. FIG. 4 and FIG. 5 are each shown in simplified, schematic format for purposes of illustrating a clear example and other embodiments may include more, fewer, or different elements connected in various manners. FIG. 4 and FIG. 5 are each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring to FIG. 4, in some embodiments, the server 102 is programmed to define a initial plurality of parameters and a performance indicator for a system category. For example, when the system category is database management, the performance indicator can be a number of queries processed during a unit time. When then system category is load balancing, the performance indicator can be a response time. The server 102 is programmed to further define, for each of a plurality of systems in the system category, an initial mapping between a list of parameters of the system and the initial plurality of parameters. The server 102 is programmed to further obtain, for each of a plurality of systems in the system category, an initial time series where each data point includes values of the initial plurality of parameters and a corresponding value of the performance indicator. One of the plurality of initial time series for one of the plurality of systems can correspond to random assignments of values to the initial plurality of parameters at different time points.

In some embodiments, in step 402, the server 102 is programmed or configured to identify a first plurality of parameters for the system category. The identifying can comprise selecting a proper subset of the initial plurality of parameters as the first plurality of parameters using the plurality of initial time series. The selecting can further comprise applying the least absolute shrinkage and selection operator (LASSO).

In some embodiments, in step 404, the server 102 is programmed or configured to define, for each of a plurality of systems in the system category, a mapping between a list of parameters of the system and the first plurality of parameters. The mapping can be derived from the initial mapping between the list of parameters of the system and the initial plurality of parameters.

In some embodiments, in step 406, the server 102 is programmed or configured to obtain, for each of the plurality of systems, a first time series in which each data point includes values of the first plurality of parameters and a corresponding value of the performance indicator. The obtaining the first time series for one of the plurality of systems can comprise receiving a time series where each data point includes values of the list of parameters of the one system and mapping the time series to the first time series based on the mapping for the one system. In addition, the obtaining can comprise receiving a log of operation of one of the plurality of systems and converting entries in the log into the first time series. The server 102 can be configured to receive a certain first time series for a certain system as the certain system produces the certain first time series in real time and a particular first time series for a particular system produced in the past by the particular system. The server 102 can also be configured to receive two of the plurality of first time series for two of the plurality of systems from two sources near simultaneously.

In some embodiments, in step 408, the server 102 is programmed or configured to apply, with the first plurality of parameters corresponding to a state, updating one or more values of the first plurality of parameters corresponding to an action, and the performance indicator corresponding to a cumulative reward function, a reinforcement learning method to improve a policy of determining an action of moving from a first state to a second state towards an optimal cumulative reward using the plurality of first time series. The reinforcement learning method can include the importance weighted actor-learning architecture (IMPALA).

In some embodiments, in step 410, the server 102 is programmed or configured to receive a specific set of values of the first plurality of parameters as a current state and a specific value of the performance indicator for a specific system in the system category. In step 412, the server 102 is programmed or configured to select a specific action applicable to the current state based on the policy.

In some embodiments, in step 414, the server 102 is programmed or configured to cause application of the specific action to the specific system. In response to the causing, the server 102 can be programmed to receive a new set of values for the first plurality of parameters and a corresponding new value for the performance indicator. The server 102 can be programmed to further apply the reinforcement learning method using the new set of values for the first plurality of parameters and the new value for the performance indicator.

In some embodiments, the server 102 is programmed to transmit the policy or the improved policy to one or more agents corresponding to one or more of the plurality of systems, where one or more of the plurality of first time series are obtained from the one or more agents, and a part of the one or more first time series are generated based on the transmitted policy or improved policy.

Referring to FIG. 5, in some embodiments, in step 502, the agent 122a is programmed or configured to send, to a server 102, a specification of a certain plurality of parameters and a performance indicator of a system in a system category. For example, when the system category is database management, the performance indicator can be a number of queries processed during a unit time. When the system category is load balancing, the performance indicator being a response time.

In some embodiments, in step 504, the agent 122a is programmed or configured to receive, from the server 102, a mapping between the certain plurality of parameters to a first plurality of parameters for the system category.

In some embodiments, in step 506, the agent 122a is programmed or configured to cause, for each of a first set of time points in a first period, the system to move to a new state according to a first policy by assigning one or more parameter values to one or more of the certain plurality of parameters that are mapped to the first plurality of parameters. The first policy can include randomly selecting one or more of the first plurality of parameters and randomly assigning permissible values to the selected parameters.

In some embodiments, in step 508, the agent 122a is programmed or configured to obtain, for each of the first set of time points in the first period, an indicator value of the performance indicator corresponding to the one or more parameter values assigned to the one of more parameters of the system at the time point. The obtaining can comprise reading a log generated by the system, the log indicating, for one of the first set of time points, one of the certain plurality of parameters taking on a new value and additional data related to a corresponding value of the performance indicator. The obtaining can also comprise receiving a log of operation of the system during the first period and calculating the indicator values at the first set of time points from the log.

In some embodiments, in step 510, the agent 122a is programmed or configured to transmit a first time series corresponding to the first set of time points, each data point in the first time series including the corresponding one or more parameter values assigned to the one or more parameters at one of the first set of time points and the corresponding indicator value of the performance indicator.

In some embodiments, the agent 122a is programmed to receive, after the transmitting, a specification of a second plurality of parameters that is a proper subset of the first plurality of parameters. The agent 122a is programmed to then cause, for each of a second set of time points in a second period, the system to move to a new state according to a second policy by assigning one or more new values to one or more of the certain plurality of parameters that are mapped to the second plurality of parameters. Furthermore, the agent 122a is programmed to obtain, for each of the second set of time points in the second period, a certain value of the performance indicator corresponding to the one or more new values assigned to one of more parameters of the system at the time point. In addition, the agent 122a is configured to transmit a second time series corresponding to the second set of time points, where each data point in the second time series includes the corresponding one or more new values assigned to the one or more parameters at one of the second set of time points and the certain value of the performance indicator.

In some embodiments, the agent 122a is programmed to further receive, during the second period, a new policy from the server 102 and updating, before the next time point in the second period, the second policy to the new policy.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
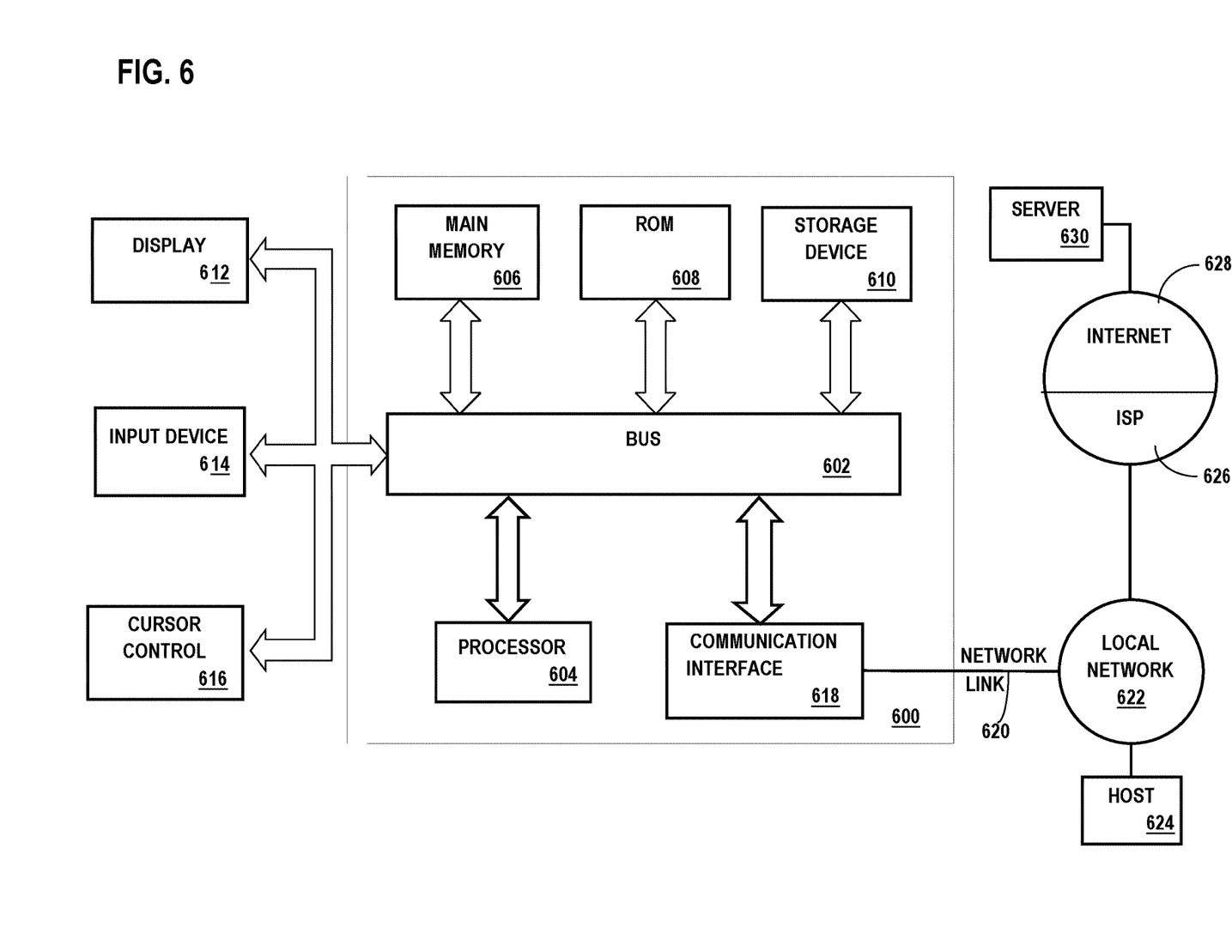
FIG. 6 is a block diagram that illustrates a computer system upon which an embodiment of the invention may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or NoSQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction

What is claimed is:

1. A computer-implemented method of automatically configuring and managing a system, comprising:
   identifying, by a processor, a first plurality of parameters and a performance indicator for a system category;
   defining, for each of a plurality of systems in the system category, a mapping between a list of parameters of the system and the first plurality of parameters;
   obtaining, for each of the plurality of systems, a first time series in which each data point includes values of the first plurality of parameters and a corresponding value of the performance indicator;
   with the first plurality of parameters corresponding to a state, updating one or more values of the first plurality of parameters corresponding to an action, and the performance indicator corresponding to a cumulative reward function, applying a reinforcement learning method to improve a policy of determining an action of moving from a first state to a second state towards an optimal cumulative reward using the plurality of first time series;
   receiving a specific set of values of the first plurality of parameters as a current state and a specific value of the performance indicator for a specific system in the system category;
   selecting a specific action applicable to the current state based on the policy;
   causing application of the specific action to the specific system;
   transmitting the policy or the improved policy to one or more agents corresponding to one or more of the plurality of systems,
   one or more of the plurality of first time series being obtained from the one or more agents,
   a part of the one or more first time series being generated based on the policy or the improved policy.

2. The computer-implemented method of claim 1,
   defining a second plurality of parameters for the system category;
      obtaining, for each of the plurality of systems, a second time series where each data point includes values of the second plurality of parameters and a corresponding value of the performance indicator,
      the identifying the first plurality of parameters comprising selecting a proper subset of the second plurality of parameters as the first plurality of parameters using the plurality of second time series.

3. The computer-implemented method of claim 2, a particular second time series of the plurality of second time series for a particular system of the plurality of systems corresponding to random assignments of values to the second plurality of parameters at different time points.

4. The computer-implemented method of claim 2, the selecting comprising applying a least absolute shrinkage and selection operator (LASSO).

5. The computer-implemented method of claim 1,
   the system category being a database management, and the performance indicator being a number of queries processed during a unit time, or
   the system category being load balancing, and the performance indicator being a response time.

6. The computer-implemented method of claim 1, the obtaining the first time series for one of the plurality of systems comprising:
   receiving a time series where each data point includes values of the list of parameters of the one system;
   mapping the time series to the first time series based on the mapping for the one system.

7. The computer-implemented method of claim 1, the obtaining the plurality of first time series comprising receiving two of the plurality of first time series for two of the plurality of systems from two sources simultaneously.

8. The computer-implemented method of claim 1, the obtaining the plurality of first time series comprising receiving a certain first time series for a certain system as the certain system produces the certain first time series in real time and a particular first time series for a particular system produced in the past by the particular system.

9. The computer-implemented method of claim 1, obtaining the first time series comprising:
   receiving a log of operation of one of the plurality of systems;
   converting entries in the log into the first time series.

10. The computer-implemented method of claim 1, the reinforcement learning method including importance weighted actor-learning architecture (IMPALA).

11. The computer-implemented method of claim 1, further comprising:
   in response to the causing, receiving a new set of values for the first plurality of parameters and a corresponding new value for the performance indicator;
   further applying the reinforcement learning method using the new set of values for the first plurality of parameters and the new value for the performance indicator.

12. One or more non-transitory storage media storing instructions which, when executed by one or more computing devices, cause performance of a method of automatically configuring and managing a system, the method comprising:
   identifying a first plurality of parameters and a performance indicator for a system category;
   defining, for each of a plurality of systems in the system category, a mapping between a list of parameters of the system and the first plurality of parameters;
   obtaining, for each of the plurality of systems, a first time series in which each data point includes values of the first plurality of parameters and a corresponding value of the performance indicator;
   with the first plurality of parameters corresponding to a state, updating one or more values of the first plurality of parameters corresponding to an action, and the performance indicator corresponding to a cumulative reward function, applying a reinforcement learning method to improve a policy of determining an action of moving from a first state to a second state towards an optimal cumulative reward using the plurality of first time series;

receiving a specific set of values of the first plurality of parameters as a current state and a specific value of the performance indicator for a specific system in the system category;

selecting a specific action applicable to the current state based on the policy;

causing application of the specific action to the specific system;

transmitting the policy or the improved policy to one or more agents corresponding to one or more of the plurality of systems, one or more of the plurality of first time series being obtained from the one or more agents, a part of the one or more first time series being generated based on the policy or the improved policy.

13. One or more non-transitory storage media storing instructions which, when executed by one or more computing devices, cause performance of a method of constructing a recommendation engine for configuring a system, the method comprising:

sending, to a server, a specification of a certain plurality of parameters and a performance indicator of a system in a system category;

receiving, from the server, a mapping between the certain plurality of parameters to a first plurality of parameters for the system category, for each of a first set of time points in a first period, causing the system to move to a new state according to a first policy by assigning one or more parameter values to one or more of the certain plurality of parameters that are mapped to the first plurality of parameters;

for each of the first set of time points in the first period, obtaining an indicator value of the performance indicator corresponding to the one or more parameter values assigned to the one of more parameters of the system at the time point;

transmitting a first time series corresponding to the first set of time points, each data point in the first time series including the corresponding one or more parameter values assigned to the one or more parameters at one of the first set of time points and the corresponding indicator value of the performance indicator;

receiving, after the transmitting, a specification of a second plurality of parameters that is a proper subset of the first plurality of parameters;

for each of a second set of time points in a second period, causing the system to move to a new state according to a second policy by assigning one or more new values to one or more of the certain plurality of parameters that are mapped to the second plurality of parameters;

for each of the second set of time points in the second period, obtaining a certain value of the performance indicator corresponding to the one or more new values assigned to the one of more parameters of the system at the time point;

transmitting a second time series corresponding to the second set of time points, each data point in the second time series including the corresponding one or more new values assigned to the one or more parameters at one of the second set of time points and the corresponding certain value of the performance indicator.

14. The one or more non-transitory storage media of claim 13, the first policy including randomly selecting one or more of the first plurality of parameters and randomly assigning permissible values to the selected parameters.

15. The one or more non-transitory storage media of claim 13, the method further comprising:

receiving, during the second period, a new policy from the server;

updating, before a next time point in the second period, the second policy to the new policy.

16. The one or more non-transitory storage media of claim 13, the obtaining comprising reading a log generated by the system, the log indicating, for one of the first set of time points, one of the certain plurality of parameters having a new value and additional data related to a corresponding value of the performance indicator.

17. The one or more non-transitory storage media of claim 13, the obtaining comprising:

receiving a log of operation of the system during the first period;

calculating the indicator values at the first set of time points from the log.

18. The one or more non-transitory storage media of claim 13, the system category being database management, and the performance indicator being a number of queries processed during a unit time, or the system category being load balancing, and the performance indicator being a response time.

* * * * *